United States Patent
Gandolph et al.

(10) Patent No.: US 9,445,042 B2
(45) Date of Patent: *Sep. 13, 2016

(54) METHOD AND APPARATUS FOR SYNCHRONIZING DATA STREAMS CONTAINING AUDIO, VIDEO AND/OR OTHER DATA

(71) Applicant: THOMSON LICENSING, Issy de Moulineaux (FR)

(72) Inventors: Dirk Gandolph, Ronnenberg (DE); Harald Schiller, Hannover (DE); Jobst Hoerentrup, Hannover (DE); Ralf Ostermann, Hannover (DE); Hartmut Peters, Barsinghausen (DE)

(73) Assignee: Thomson Licensing, Issy les moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,815

(22) Filed: Jan. 21, 2016

(65) Prior Publication Data
US 2016/0156872 A1     Jun. 2, 2016

Related U.S. Application Data

(62) Division of application No. 14/874,734, filed on Oct. 5, 2015, now Pat. No. 9,338,390, which is a division of application No. 10/530,118, filed on Apr. 1, 2005, now Pat. No. 8,387,091.

(51) Int. Cl.
*H04N 5/92*     (2006.01)
*H04N 5/85*     (2006.01)
(Continued)

(52) U.S. Cl.
CPC ........... *H04N 5/9305* (2013.01); *G11B 27/034* (2013.01); *G11B 27/10* (2013.01);
(Continued)

(58) Field of Classification Search
CPC .... H04N 5/9207; H04N 5/85; H04N 5/9305; H04N 5/9202; H04N 9/87; H04N 21/2387; H04N 21/242; G11B 27/034; G11B 27/10; G11B 27/105; G11B 27/32; G11B 27/322
See application file for complete search history.

(56) References Cited

U.S. PATENT DOCUMENTS 5,745,643 A *   4/1998   Mishina ............... G11B 7/0037
                                                                            386/220
5,902,115 A *   5/1999   Katayama ............. G10H 1/363
                                                                            360/135

(Continued)

FOREIGN PATENT DOCUMENTS

EP         1198133       4/2001
EP         1103974       5/2011
(Continued)

OTHER PUBLICATIONS

Nasiopoulos et al., "The Challenge of DVD Authoring", DSP 97—IEEE, 1977.

*Primary Examiner* — Randy Flynn
(74) *Attorney, Agent, or Firm* — Brian J. Dorini; Joseph J. Opalach

(57) ABSTRACT

Several data streams contain video, audio and/or other data. Some of the data streams are pre-recorded in a multiplex on a storage medium while other data streams are located out of the data stream multiplex on the storage medium. The data streams are synchronized using a navigation file (List_of_PlayItems), which comprises descriptors (PlayItems, Sub-PlayItems) pointing to parts of said data streams, wherein said descriptors define the arrangement in time for said data streams by means of data sub stream paths.

3 Claims, 1 Drawing Sheet

(51) Int. Cl.
*H04N 5/93* (2006.01)
*G11B 27/034* (2006.01)
*G11B 27/10* (2006.01)
*G11B 27/32* (2006.01)
*H04N 9/87* (2006.01)
*H04N 21/2387* (2011.01)
*H04N 21/242* (2011.01)

(52) U.S. Cl.
CPC ............ *G11B 27/105* (2013.01); *G11B 27/32* (2013.01); *G11B 27/322* (2013.01); *H04N 5/85* (2013.01); *H04N 5/9202* (2013.01); *H04N 5/9207* (2013.01); *H04N 9/87* (2013.01); *H04N 21/2387* (2013.01); *H04N 21/242* (2013.01); *G11B 2220/2541* (2013.01); *G11B 2220/2562* (2013.01)

(56) References Cited

U.S. PATENT DOCUMENTS

| | | | |
|---|---|---|---|
| 6,215,530 B1 | 4/2001 | Wasilewski | |
| 6,289,165 B1 | 9/2001 | Abecassis | |
| 6,341,127 B1 | 1/2002 | Katsube et al. | |
| 6,381,398 B1 | 4/2002 | Yamauchi et al. | |
| 6,415,101 B1 * | 7/2002 | deCarmo | H04N 5/4401 348/E5.108 |
| 6,778,759 B1 | 8/2004 | Yamada et al. | |
| 6,801,575 B1 | 10/2004 | Crinon | |
| 6,993,789 B1 | 1/2006 | Sezan et al. | |
| 7,184,450 B1 | 2/2007 | Wolf et al. | |
| 7,188,353 B1 | 3/2007 | Crinon | |
| 7,643,727 B2 | 1/2010 | Cho et al. | |
| 8,381,254 B2 | 2/2013 | Adolph et al. | |
| 8,387,091 B2 | 2/2013 | Adolph et al. | |
| 8,588,585 B2 | 11/2013 | Gandolph et al. | |
| 2002/0006268 A1 | 1/2002 | Chotoku et al. | |
| 2002/0135607 A1 | 9/2002 | Kato et al. | |
| 2002/0135608 A1 | 9/2002 | Hamada et al. | |
| 2002/0145702 A1 | 10/2002 | Kato et al. | |
| 2003/0035649 A1 | 2/2003 | Chung et al. | |
| 2004/0240856 A1 | 12/2004 | Yahata et al. | |
| 2004/0261099 A1 | 12/2004 | Durden et al. | |

FOREIGN PATENT DOCUMENTS

| | | |
|---|---|---|
| JP | 11098467 | 4/1999 |
| JP | 2001157145 | 6/2001 |
| JP | 2002158974 | 5/2002 |
| JP | 2002247526 | 8/2002 |
| JP | 2006502635 | 1/2006 |
| WO | WO2004034398 | 4/2004 |

* cited by examiner

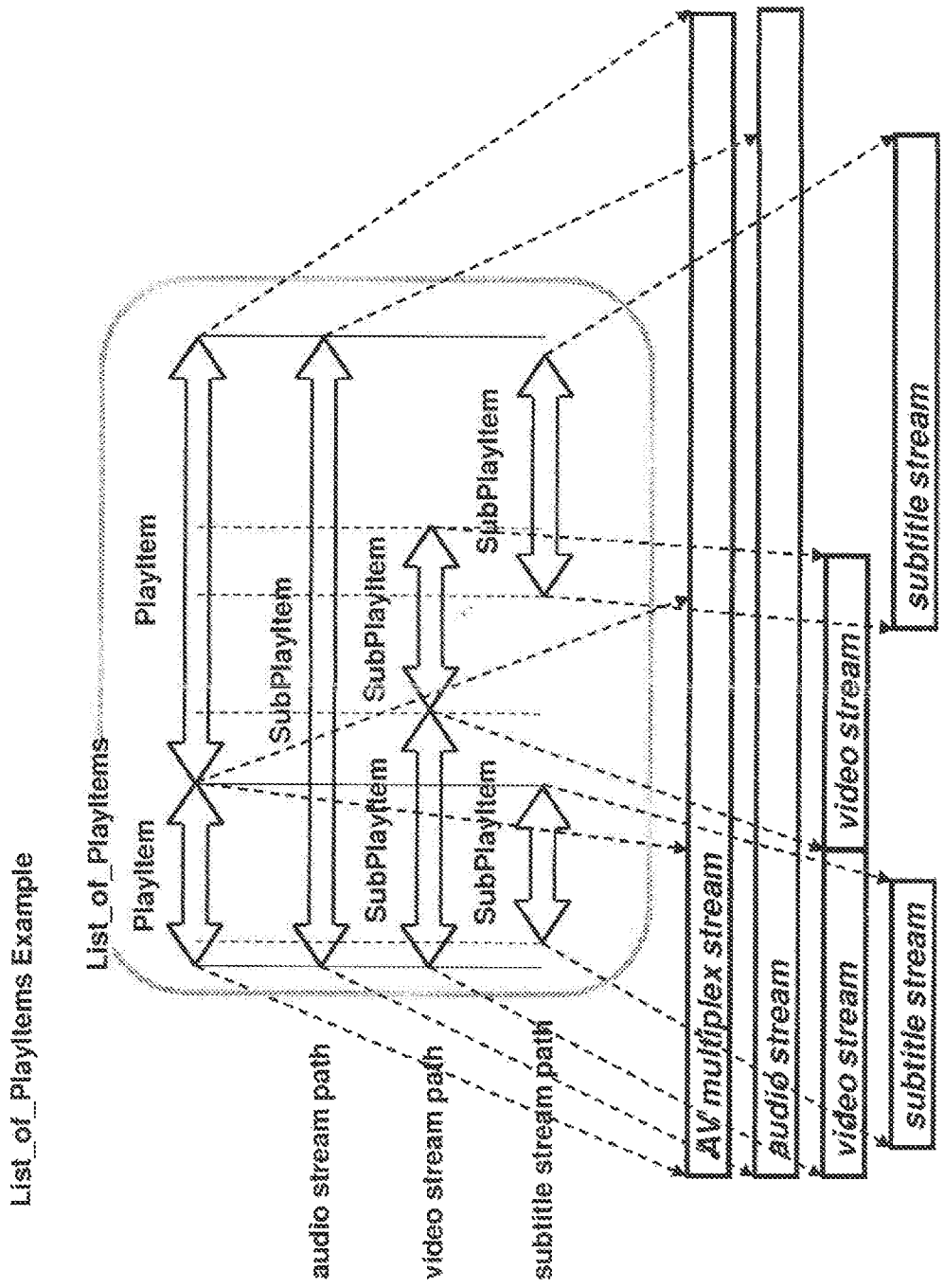

METHOD AND APPARATUS FOR SYNCHRONIZING DATA STREAMS CONTAINING AUDIO, VIDEO AND/OR OTHER DATA

CROSS-REFERENCE TO RELATED APPLICATIONS

This application claims benefit under 35 U.S.C. §120 and is a division of U.S. patent application Ser. No. 10/530,118 filed Apr. 1, 2005, which is a 35 U.S.C. §371 national stage application of PCT/EP03/10801 filed Sep. 29, 2003, and published in accordance with PCT Article 21 (2) on Apr. 22, 2004 in English and claiming priority of EPO Application 02022765.8, filed Oct. 11, 2002. This application is also related to commonly assigned, U.S. patent application Ser. No. 13/065,414, entitled METHOD AND APPARATUS FOR SYNCHRONIZING DATA STREAMS CONTAINING AUDIO, VIDEO AND/OR OTHER DATA; U.S. patent application Ser. No. 13/065,420, entitled METHOD AND APPARATUS FOR SYNCHRONIZING DATA STREAMS CONTAINING AUDIO, VIDEO AND/OR OTHER DATA; U.S. patent application Ser. No. 13/742,468, entitled METHOD AND APPARATUS FOR SYNCHRONIZING DATA STREAMS CONTAINING AUDIO, VIDEO AND/OR OTHER DATA; U.S. patent application Ser. No. 13/742,570, entitled METHOD AND APPARATUS FOR SYNCHRONIZING DATA STREAMS CONTAINING AUDIO, VIDEO AND/OR OTHER DATA; U.S. patent application Ser. No. 14/045,978, entitled METHOD AND APPARATUS FOR SYNCHRONIZING DATA STREAMS CONTAINING AUDIO, VIDEO AND/OR OTHER DATA; U.S. patent application Ser. No. 14/045,984, entitled METHOD AND APPARATUS FOR SYNCHRONIZING DATA STREAMS CONTAINING AUDIO, VIDEO AND/OR OTHER DATA; U.S. patent application Ser. No. 14/321,040, entitled METHOD AND APPARATUS FOR SYNCHRONIZING DATA STREAMS CONTAINING AUDIO, VIDEO AND/OR OTHER DATA and co-pending U.S. patent application Ser. No. 14/874,734, entitled METHOD AND APPARATUS FOR SYNCHRONIZING DATA STREAMS CONTAINING AUDIO, VIDEO AND/OR OTHER DATA.

The invention relates to a method and to an apparatus for synchronizing data streams containing audio, video and/or other data, wherein some of the data streams are recorded in a multiplex on a storage medium and other data streams are located out of the data stream multiplex.

BACKGROUND

Optical storage media facilitate recording or replaying of audiovisual (AV) signals that include one or more video and audio data streams and/or other data like subtitles and service information. Based on the Digital Versatile Disc (DVD) standard published by www.dvdforum.org pre-recorded movie titles are replicated for a mass market using read-only optical discs. Following introduction and proliferation of the red laser based DVD standard, a blue laser based media system of even higher capacity has recently been published under the brand name 'Blu-ray Disc' denoted BD.

For nowadays DVDs the content providers create videos for many different target countries. This encompasses many different languages and sub-titles. Additional to this language specific versions of AV material there exists the application of multi-angle and multi-story for optical discs. In BD applications this possibilities will be enlarged by introducing different video formats as SDTV and HDTV videos. For optical recording and pre-recording all the different elementary streams listed above (video-angle, audio-track, subtitle etc.) have to be packetized into a single multiplex transport stream. During, playback the decoder is, reading this multiplex and decodes those packets belonging to the streams selected.

INVENTION

The invention is based on the recognition of the following fact. Having an AV multiplex carrying all the available components it is not possible to provide additional material, like another sound track or another web-page for a later time. I.e. when a content provider is using an authoring tool for the generation of a BD movie all elementary streams have to be known before starting the generation. It is not possible to add another elementary stream after the AV multiplex production. On the other hand, if a further data stream shall be added later on, this requires a synchronization with the already existing data streams.

Therefore, a problem to be solved by the invention is to allow synchronizing of data streams recorded in a multiplex on a storage medium with further data streams located out of this data stream multiplex.

This problem is solved as disclosed in the independent claims.

In principle, the inventive method allows synchronizing data streams containing video, audio and/or other data, wherein some of the data streams are pre-recorded in a multiplex on a storage medium, wherein a navigation file comprises descriptors pointing to parts of said data streams, wherein said descriptors define the arrangement in time for said data streams by means of data sub stream paths.

DRAWINGS

Exemplary embodiments of the invention are described with reference to the accompanying drawing, which shows an example of a play list encompassing different video, audio and subtitle stream paths.

EXEMPLARY EMBODIMENTS

FIG. 1 shows an example of a play list List_of_PlayItems encompassing different video, audio and subtitle stream paths with PlayItems or SubPlayItems, which have to be decoded for playing back of a stream path. A first stream path of PlayItems comprises an AV multiplex stream. Furthermore, several SubPlayItems describe audio, video and subtitle stream paths as depicted.

As shown, multiple stream paths may exist in parallel on the global time axis of the PlayList. A stream path may be defined leaky by leaving parts of the time axis empty.

Any stream described by a PlayItem or a SubPlayItem may be an elementary stream or again a multiplex of streams.

The inventive synchronization of elementary streams being located out of the main AV multiplex on a optical disc is described in the following.

Synchronization is thought of for two different cases. The first case is the synchronization of components concerning their relative relation in time. It is determining to which time the separate components start and end. The second case is the synchronization of components concerning their switching. It is determining points in time and in the binary stream were the decoding of one component can be substituted by decoding another component. The switching of a video components for example is useful for multi-angle applications.

The preferable medium for such an application will be beyond DVD capabilities e.g. a blu-ray disc to provide the transfer rate needed for out of multiplex bit-stream reading.

The out of multiplex semantic provides the ability to playback blu-ray disc AV streams combining different elementary streams inclusive a combination of streams coming from disc and via internet or another storage medium. E.g. there could be a playback of a movie where the video stream is read from a blu-ray disc the audio stream is read from a hard disc and the sub-title is read from an internet service.

The description for out of multiplex AV material consists of different files including navigation files and stream files. The navigation files provide all entry points for navigation within the stream files as there are points in the time axis, angle of view, sub-titles and audio channels etc. In a higher layer of the navigation files there exists a list of play items explaining all stream parts belonging to a playback of the AV material.

In the following a generic syntax for higher level navigation files is described. In the tables 1 till 4 only those elements are outlined which are mandatory for this invention, i.e. additional elements not described here as well as different orders may be possible.

As defined within Table 1 a playback element on disc which might be any part of a movie (e.g. a chapter) is described by means of a List_of_PlayItems. It consist of length indicating the complete length of the structure in byte, playItems indicating the number of PlayItem( ) elements and sub-PlayItems indicating the number of SubPlayItems( ) within the List_of_PlayItems structure. While at least one PlayItem is mandatory for a List_of_PlayItems the SubPlayItems are optional. The time axis of SubPlayItem(s) is referring to the time axis of the PlayItem(s).

TABLE 1

List_of_PlayItems - Syntax

| Syntax | No. of bits | Mnemonic |
|---|---|---|
| List_of_PlayItems( ) { | | |
|    length | 16 | uimsbf |
|    playItems | 16 | uimsbf |
|    ... | | |
|    subPlayItems | 16 | uimsbf |
|    ... | | |
|    for (n = 1; n < playItems; n++) { | | |
|       PlayItem( ) { | | |
|          ... | | |
|       } | | |
|    } | | |
|    for (n = 1; n < subPlayItems; n++) { | | |
|       SubPlayItem( ) { | | |
|          ... | | |
|       } | | |
|    ... | | |
| } | | |

As defined within Table 2 a PlayItem structure consists of length indicating the complete length of the structure in byte, StreamFile describing a link to the elementary stream file, Start_time describing the presentation start time of the PlayItem within the StreamFile and End_time describing the presentation end time of the PlayItem within the StreamFile.

Additionally it consists of the element "reserved" to preserve byte alignment, Seamless_presentation_flag indicating if this PlayItem provides seamless transitions between components. The Seamless_presentation_flag has the same meaning as within the SubPlayItem (Table 3) and is explained in more details there.

TABLE 2

PlayItem - Syntax

| Syntax | No. of bits | Mnemonic |
|---|---|---|
| PlayItem ( ) { | | |
|    length | 16 | uimsbf |
|    StreamFlie | ... | ... |
|    ... | | |
|    Start_time | 32 | uimsbf |
|    End_time | 32 | uimsbf |
|    ... | | |
|    reserved | 11 | bslbf |
|    Seamless_presentation_flag | 1 | bslbf |
|    ... | | |
| } | | |

As defined within Table 3 a SubPlayItem structure very similar to the structure of a PlayItem. It consists of length indicating the complete length of the structure in byte, StreamFile describing a link to the elementary stream file, Start_time describing the presentation start time of the PlayItem within the StreamFile and End_time describing the presentation end time of the PlayItem within the StreamFile.

Additionally it consists of the element "reserved" to preserve byte alignment, Seamless_presentation_flag indicating if this PlayItem provides seamless transitions between components, Stream_path_end indicating the end of a sub stream path and SubStream_type an one 8-bit field indicating the type of sub stream path given for the SubPlayItem.

TABLE 3

SubPlayItem - Syntax

| Syntax | No. of bits | Mnemonic |
|---|---|---|
| SubPlayItem( ) { | | |
|    length | 16 | uimsbf |
|    StreamFile | ... | ... |
|    ... | | |
|    Start_time... | 32 | uimsbf |
|    End_time... | 32 | uimsbf |
|    ... | | |
|    reserved | 6 | bslbf |
|    Seamless_presentation_flag | 1 | bslbf |
|    Stream_path_end | 1 | bslbf |
|    SubStream_type | 8 | bslbf |
|    ... | | |
| } | | |

As defined within Table 4 the SubStream_type defines the type of SubPlayItem. This can be an auxiliary audio stream path for audio dubbing, a video stream path, an audio stream path, a subtitle stream path or a graphics stream path. The value 6 till 255 can be used for future stream path formats.

TABLE 4

SubStream_type

| SubStream_type | Meaning |
|---|---|
| 0 | reserved for future use |
| 1 | Auxiliary audio stream path |
| 2 | Video stream path |
| 3 | Audio stream path |

TABLE 4-continued

| SubStream_type | |
|---|---|
| SubStream_type | Meaning |
| 4 | Subtitle stream path |
| 5 | Graphics stream path |
| 6-255 | reserved for future use |

An alternative definition of the SubStream_type is possible as shown in Table 5. The advantage of divining an auxiliary transport stream path instead of different elementary stream paths is, that any elementary stream can again be embedded within another multiplex stream, i.e. several different sub-titles may be multiplexed together within a single file.

TABLE 5

| SubStream_type | |
|---|---|
| SubStream_type | Meaning |
| 0 | reserved for future use |
| 1 | Auxiliary audio stream path |
| 2 | Auxiliary transport stream path |
| 3-255 | reserved for future use |

Seamless_presentation_flag supports the case of synchronization concerning seamless switching of components during playback.

The Seamless_presentation_flag is located within the PlayItem/SubPlayItem and indicates if the transport stream referenced to by PlayItem/SubPlayItem is supporting seamless transitions between its elementary streams. If Seamless_presentation_flag is set "true", all elementary streams within the transport stream obey the seamless transition restrictions.

The seamless transition restrictions are providing Splice Points within the elementary stream. Splice Points are points at which the decoding of one elementary stream can be stopped and the decoding of another can be started without having any noticeable effect during playback, presuming that both elementary streams have been encoded by obeying the seamless transition restrictions. The generation of Splice Points is reached during encoding by defining a mandatory GOP raster, e.g. a fixed GOP length, and by limiting the required buffer size, to avoid buffer overflows when switching different elementary streams during decoding.

A typical application for seamless transitions are multi-angle videos. A multi-angle video provides different camera angles for a video e.g. one camera within the race-car, another showing the box, one showing the finish line etc. When the multi-angle video is played back the user can switch seamless between this different camera tracks.

Stream_path_end and SubStream_type support the case of synchronization concerning the relative relation of components in time.

Stream_path_end: This flag indicates the end of a stream path. A stream path is an ordered set of SubPlayItems. It defines the number and order of all SubPlayItems belonging to the stream path. The first stream path starts with the first SubPlayItem and ends with the first SubPlayItem having the Stream_path_end flag set "true". The second stream path starts with the first SubPlayItem following the previous stream path and ends with the first SubPlayItem having the Stream_path_end flag set "true", and so on. The last stream path ends with the last SubPlayItem. Setting the Stream_path_end flag "true" for the last SubPlayItem of the PlayList is optional. All SubPlayItems of a stream path shall have the same SubPlayItem_type.

Playing back a stream path will decode the consecutive set of SubPlayItems belonging to the stream path including either the first SubPlayItem having the Stream_path_end flag set "true" or the last SubPlayItem of the PlayList.

The Transport Stream (TS) is organized according to the MPEG-2 Systems standard as specified in ISO/IEC 13818-1, Generic coding of moving pictures and associated audio information. However, in order to guarantee a conflict free playback during decoding and at the same time a late and independent addition of content, e.g. the adding of auxiliary subtitles after the main authoring has already been finalized, the following rules of restrictions for the transport streams are necessary:

The TS of PlayItems must contain a Program Association Table (PAT) and Program Map Table (PMT). They provide the PID table and language information for every TS component (elementary stream) within the multiplex.

The TS of SubPlayItems contains auxiliary streams. The preferred format of auxiliary streams again is a TS.

Within the TS of a SubPlayItem no PAT is allowed. This prevents conflicts with the TS of the PlayItem.

The TS of a SubPlayItem must contain a PMT whose PID is not used within the TS of PlayItems.

All PID associated to elementary streams within all TS for PlayItems as well as SubPlayItems must be different.

The advantage of the TS rules listed above is, that a single PID filter is sufficient for decoding all elementary streams. When violating the TS rules a PID re-stamping before buffering the input data or the separating of different buffers becomes necessary.

The invention has several advantages:

It provides more flexibility for the authoring of pre-recorded blue-ray discs. E.g. after the finalization of the main AV multiplex, additional languages can easily be added to the disc at a later time. This is because an auxiliary AV multiplexes containing e.g. audio and sub-title information in other languages can be prepared independently and added to the disc image without changing the basic AV multiplex (no recoding, re-multiplexing required).

There are no limitation for the maximum number of audio, subtitle, video angles, AV formats etc. caused by the band-width given for the multiplex. The limitation is simply defined by the volume capacity.

It allows optional binding of external sources to disc content e.g. a special sound track from hard disc or Internet server, resulting in added value by binding new streams to pre-recorded discs.

Furthermore, rules are provided for simplified decoding of elementary streams coming from different transport streams and for seamless stream switching (e.g. for multi-angle videos) across different transport streams.

The invention claimed is:

1. A method for playback of data streams from a non-transitory storage medium, said data streams containing video, audio and/or other data, the method comprising:
   retrieving a basic stream path of consecutive descriptors pointing to parts of a basic AV MPEG-2 transport stream of multiplexed elementary streams,
   wherein said descriptors define the arrangement in time for playing back said parts of said basic AV MPEG-2 transport stream;
   retrieving one or more sub stream paths of consecutive descriptors existing in parallel to said basic stream path, said one or more sub stream paths of consecutive descriptors pointing to data streams or parts of data streams, wherein at least one of said one or more sub stream paths of consecutive descriptors points to a transport stream or a part of a transport stream of multiplexed elementary streams located out of said basic AV MPEG-2 transport stream;

retrieving indications on the stream path type of each of said one or more sub stream paths of consecutive descriptors; and decoding said parts of said basic AV MPEG-2 transport stream of multiplexed elementary streams and said transport stream or said part of said transport stream of multiplexed elementary streams located out of said basic AV MPEG-2 transport stream as defined by said basic stream path of consecutive descriptors and said at least one of said one or more sub stream paths of consecutive descriptors, wherein said descriptors of said one or more sub stream paths of consecutive descriptors point at said basic AV MPEG-2 transport stream, thus said descriptors allowing to locate the part of said basic AV MPEG-2 transport stream to which the corresponding sub stream path is bound, and to bind the corresponding sub stream path to the located part of said basic AV MPEG-2 transport stream, wherein said transport stream or said part of said transport stream of multiplexed elementary streams located out of said basic AV MPEG-2 transport stream comprises a Seamless presentation flag indicating that synchronisation concerning seamless switching between parts of said basic MPEG-2 transport stream and said transport stream or said part of said transport stream of multiplexed elementary streams located out of said basic AV MPEG-2 transport stream during playback is supported.

2. A method for storing data streams containing video, audio and/or other data on a non-transitory storage medium, the method comprising:

defining a basic stream path of consecutive descriptors pointing to parts of a basic AV MPEG-2 transport stream of multiplexed elementary streams, wherein said descriptors define the arrangement in time for playing back said parts of said basic AV MPEG-2 transport stream;

defining one or more sub stream paths of consecutive descriptors existing in parallel to said basic stream path, said one or more sub stream paths of consecutive descriptors pointing to data streams or parts of data streams, wherein at least one of said one or more sub stream paths of consecutive descriptors points to a transport stream or a part of a transport stream of multiplexed elementary streams located out of said basic AV MPEG-2 transport stream;

indicating the stream path type of each of said one or more sub stream paths of consecutive descriptors; and storing said basic AV MPEG-2 transport stream of multiplexed elementary streams, said transport stream of multiplexed elementary streams located out of said basic AV MPEG-2 transport stream, said basic stream path of consecutive descriptors and said one or more sub stream paths of consecutive descriptors, and indications of the stream path type of each of said one or more sub stream paths of consecutive descriptors on the non-transitory storage medium, wherein said descriptors of said one or more sub stream paths of consecutive descriptors point at said basic AV MPEG-2 transport stream, thus said descriptors allowing a computer to locate the part of said basic AV MPEG-2 transport stream to which the corresponding sub stream path is bound, and to bind the corresponding sub stream path to the located part of said basic AV MPEG-2 transport stream, wherein said transport stream or said part of said transport stream of multiplexed elementary streams located out of said basic AV MPEG-2 transport stream comprises a Seamless presentation flag indicating that synchronisation concerning seamless switching between parts of said basic MPEG-2 transport stream and said transport stream or said part of said transport stream of multiplexed elementary streams located out of said basic AV MPEG-2 transport stream during playback is supported.

3. A non-transitory computer readable storage medium comprising data streams containing video, audio and/or other data, the non-transitory storage medium comprising:

a basic AV MPEG-2 transport stream of multiplexed elementary streams;

a transport stream of multiplexed elementary streams located out of said basic AV MPEG-2 transport stream a basic stream path of consecutive descriptors pointing to parts of said basic AV MPEG-2 transport stream of multiplexed elementary streams, wherein said descriptors define the arrangement in time for playing back said parts of said basic AV MPEG-2 transport stream;

one or more sub stream paths of consecutive descriptors existing in parallel to said basic stream path, said one or more sub stream paths of consecutive descriptors pointing to data streams or parts of data streams, wherein at least one of said one or more sub stream paths of consecutive descriptors points to said transport stream or a part of said transport stream of multiplexed elementary streams located out of said basic AV MPEG-2 transport stream, and indications of the stream path type of each of said sub stream paths of consecutive descriptors;

said descriptors of said one or more sub stream paths of consecutive descriptors pointing at said basic AV MPEG-2 transport stream, thus said descriptors allowing a computer to locate the part of said basic AV MPEG-2 transport stream to which the corresponding sub stream path is bound, and to bind the corresponding sub stream path to the located part of said basic AV MPEG-2 transport stream, wherein said transport stream or said part of said transport stream of multiplexed elementary streams located out of said basic AV MPEG-2 transport stream comprises a Seamless presentation flag indicating that synchronisation concerning seamless switching between parts of said basic MPEG-2 transport stream and said transport stream or said part of said transport stream of multiplexed elementary streams located out of said basic AV MPEG-2 transport stream during playback is supported.

* * * * *